June 19, 1945.  W. R. MILES  2,378,493
OPTICAL DEVICE
Filed Jan. 10, 1944

Inventor:
Walter R. Miles
By Pierce + Scheffler
Attorneys.

Patented June 19, 1945

2,378,493

UNITED STATES PATENT OFFICE 2,378,493

OPTICAL DEVICE

Walter R. Miles, New Haven, Conn., assignor to Research Corporation, New York, N. Y., a corporation of New York Application January 10, 1944, Serial No. 517,698

7 Claims. (Cl. 88—41)

The invention relates to an optical device for increasing the effectiveness of the visual inspection of areas.

A principal purpose of the invention is to provide a device whereby visual inspection may be made of a strong source of light, such as the sun or a welding flame or arc, as well as of the areas adjacent the source of light with the greatest possible effectiveness and a minimum of discomfort to the observer.

In occupations or circumstances where visual attention should be given to a bright light and also to the area near it, the human eye may be taxed beyond its unaided capacity. The strong light is said to blind the observer. A common method of dealing with such a difficulty is to shade the eyes with the hand or some other opaque object and thus favor the dimmer areas. The position and movement of the light are then judged without looking at it directly. In some cases, for example, on the highway, this constitutes a hazard. If the alternate method is chosen and the brightness of the light is reduced by common means such as smoked glasses, this is at the expense of good visibility for the field near the light source. The fusion-density device of the invention provides a means of simultaneously adjusting the relative brightnesses of light source and surroundings to the advantage and comfort of vision, with a minimum of restriction upon effective observation near the source of light.

Broadly speaking, the optical device of the invention comprises light transmitting means, such as a pair of lenses or a window; means, such as spectacle or goggle frames, or a hood or helmet, for positioning the light transmitting means before the eyes; and a pair of oblong elements or "patches" of substantially different light transmittance from the light transmitting means, one of said pair of elements being positioned in the path of vision of each eye with their major dimensions substantially at right angles to each other whereby the elements will be binocularly fused into partial coincidence. The size of the elements is such that the coincidental area in binocular vision is only a portion, and preferably only a minor portion, of the field of vision. The lens or window members may be made of any desired transparent or translucent material such as glass, quartz or plastic composition. The difference in light transmittance between the lens or window members and the patches may be selected in kind and amount with regard to any particular use to which the device is to be put and the term "difference in light transmittance" is intended to include differences in spectral composition or in polarization of the transmitted light as well as differences in the overall amount of light transmitted.

The invention will be more particularly described with reference to the accompanying drawing in which.

Figure 1:
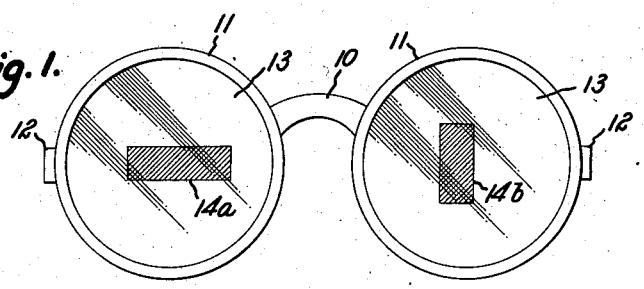
Fig. 1 is a diagrammatic representation of spectacles or goggles embodying the invention.

In Fig. 1, the frame of the goggles is represented by bridge 10, rims 11 and temple hinges 12. The lenses 13 may be made of any suitable material such as glass, quartz or plastic composition, and may be flat or provided with spherical, cylindrical, toric or other curved surfaces. In each of the lenses is a patch 14a, 14b of less light transmittance than the lens. The patches may be integral with the lens material or may consist of separate elements attached to or disposed adjacent the surface of the lens, or positioned between elements of the lens. Both patches are usually disposed to intercept the normal lines of sight for the two eyes when the wearer of the device faces and directs his eyes at the object or field which he wishes to inspect.

Each of the patches is approximately 1/16 inch in width and about 1 inch in length. In general, the width of the patches is somewhat larger than the width subtended at the position of the patch by the normal pupil opening under the conditions of use, and the length is from two to three times the width or longer. The length of the patches may be equal or unequal.

An essential feature of the invention is that the longer axis of the patch in front of one eye is at right angles to that of the patch in front of the other eye. By the provision of asymmetrically disposed elements elongated at right angles to each other, it is possible to provide for differences in distance between the eyes and for varying degrees of convergence of the eyes so that the binocularly fused area of coincidence of the two elements exists in the field of binocular vision over a wide range of focal distances and of individual physiological eye variations.

Figure 2:
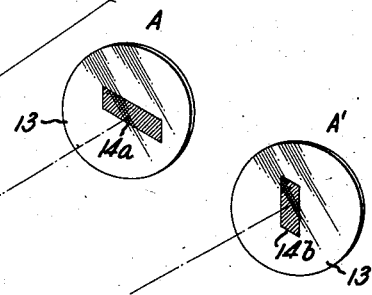
Fig. 2 is a diagrammatic representation of the principle of operation of the invention.

The principle of operation of the invention is diagrammatically illustrated in Fig. 2, wherein A and A' represent the right and left hand lens members or ocular areas, respectively, and B represents the fused binocular visual effect at the focal plane. The intersection of the two bars C and D of the shaded area forms a dark square E which has the density of the lens member plus the density of 14a or 14b, but not of the sum of their densities since they have not been physically superimposed. The non-coincidental portions of the bars C and D represent the shaded areas contributed by the right and left eyes, respectively, alone. The center of the cross where the two bars intersect represents the projected retinal areas common to both eyes as covered by the patches. This central section of the cross, occupying a solid angle of approximately 8 to 10 degrees, appears as a sharply bounded region of relatively uniform density through which a light source may be viewed.

The use of this device may be described for illustration in connection with viewing the unclouded sun. A fusion-density goggle suitable for this purpose might satisfactorily be made of lenses that transmit $\frac{1}{10}$ of the visible light, that is, with density 1.0. The patches may have a transmittance of $\frac{1}{1,000}$, which is density 3.0. The patch and the lens on which it is mounted would jointly have a density of about 4.0 thus reducing the apparent brightness in the patch area to approximately $\frac{1}{10,000}$. The subject wearing the fusion-density device looks directly at the sun placing its image in the intersection of the two density bars. Now the sun is reduced to $\frac{1}{10,000}$ brightness and the area outside the patch to $\frac{1}{10}$ brightness. By slight movement of the head the sun's disc can be placed at any convenient position within the dark square, for example, in one corner. In this position the entire disc can be examined for the presence of any silhouette, and simultaneously most of the sky area near the sun can be inspected. A 90 degree sector centering at the limb of the sun is totally unclouded. The horizontal arms of the cross beyond the central square constitute darkened areas for one eye but not for the other. Similarly the vertical arms of the cross are clouded for but one eye. Therefore, the arms appear much lighter than the intersection square and offer little hindrance to visual inspection of the regions thus covered. By slightly moving the head and placing the sun's image in one corner and then in another, the sky area adjacent to the sun in all directions can be rapidly surveyed while the sun's disc is continuously in view and its glaring rays are restrained from directly entering the eyes.

The density of the patches and of the lens or window will, of course, be varied in accordance with the use for which the device is intended and the patches may for some purposes be entirely or substantially opaque. The patches may, if desired, be rotatable, or otherwise adjustable in position, with respect to the lens or window.

Figure 3:
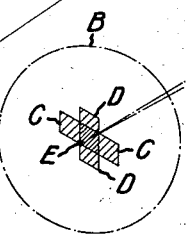
Fig. 3 is a diagrammatic representation of a welder's mask embodying the invention.
Figure 3:
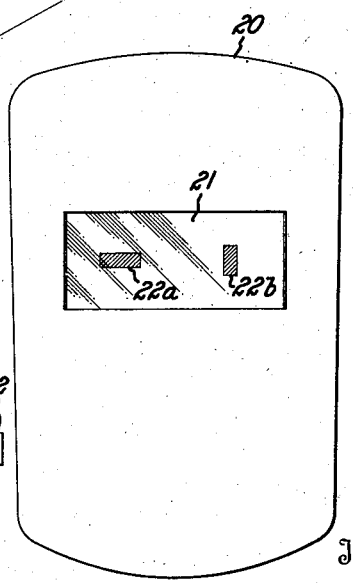

In Fig. 3 is illustrated the application of the invention to a welder's hood. In the face portion of the hood designated by numeral 20, is a window 21 of glass or other translucent material provided with patches 22a, 22b similar in general characteristics and arrangements to the patches 14a, 14b of Fig. 1. The window 21 may be substantially clear but, in general, will preferably be of somewhat reduced transmittance to decrease the transmission of glare. The density of the filter patch elements 22a, 22b will, in general, vary with the kind of work for which the hood is to be used. The density of the elements would, for example, be greater for arc welding than for flame welding.

In the form of the invention illustrated in Fig. 1, for example, it may be particularly desirable to provide a more general purpose device by providing lens members 13 comprising the known variable density polarizing lens, wherein variation in density is obtained by relative rotation of two superimposed polarizing lens elements.

Figure 4:
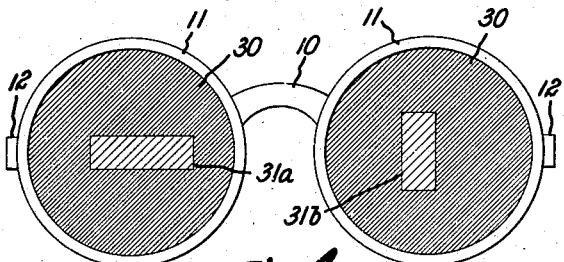
Fig. 4 is a further embodiment of the invention.

The form of the invention shown in Fig. 4, is similar to that of Fig. 1 except that the elements 31a, 31b have a substantially greater light transmittance than the lens members 30. In this form of the invention the binocularly fused area of coincidence of the patches transmits considerably more light than the remainder of the field, so that the device may be used to view a relatively dark area between two or more strong light sources. This form of the invention would be very useful, for example, to an overhead crane operator in a building in which articles must be picked up from a floor on which a number of welding operations are being carried on.

The application of the invention to such devices as binoculars, field glasses, binocular sights, single window goggles, visors, welders' handshields and other visual aids of like nature will be obvious.

The device of the invention in some of its embodiments, particularly when the patches differ in relative spectral transmission from the lens or window, may be used in piercing camouflage or improving acuity of vision through haze.

More than one pair of patches may be provided in the optical device of the invention, for example, one of each pair in the upper half of the lens or window and one in the lower half. This is particularly useful to provide a single device useful for substantially different purposes or under substantially different conditions.

The term "oblong" is used in the specification and claims in its broader sense to denote elements having one axis substantially longer than the other, such as rhombic and elliptical patches, and is not limited to rectangular elements.

It will be seen that the form and method of construction of the device and the arrangement of its elements may be widely varied without departing from the principles of the invention as defined in the claims.

I claim:

1. An optical device for the visual inspection of areas comprising light transmitting means, means positioning said light transmitting means before the eyes, and a pair of oblong light transmitting elements of substantially different light transmittance from said light transmitting means positioned one in the path of vision of each eye with their major axes disposed at substantially right angles to each other to be binocularly fused into partial coincidence intermediate the end portions of said elements to provide an area in a portion only of the field of vision having an effective binocular light transmittance equivalent to the intrinsic light transmittance of said elements.

2. An optical device for the visual inspection of areas comprising a pair of lenses, means positioning said lenses before the eyes, and a pair of oblong light transmitting elements of substantially different light transmittance from said lenses positioned one in the path of vision of each eye with their major axes disposed at substantially right angles to each other to be binocularly fused into partial coincidence intermediate the end portions of said elements to provide an area in a portion only of the field of vision having an effective binocular light transmittance equivalent to the intrinsic light transmittance of said elements.

3. An optical device for the visual inspection of areas comprising a light transmitting window member, means positioning said window member before the eyes, and a pair of oblong light transmitting elements of substantially different light transmittance from said window member positioned one in the path of vision of each eye with their major axes disposed at substantially right angles to each other to be binocularly fused into partial coincidence intermediate the end portions of said elements to provide an area in a portion only of the field of vision having an effective binocular light transmittance equivalent to the intrinsic light transmittance of said elements.

4. An optical device for the visual inspection of areas, comprising light transmitting means, means positioning said light transmitting means before the eyes, and a pair of oblong light transmitting elements of substantially less light transmittance from said light transmitting means positioned one in the path of vision of each eye with their major axes disposed at substantially right angles to each other to be binocularly fused into partial coincidence intermediate the end portions of said elements to provide an area in a portion only of the field of vision having an effective binocular light transmittance equivalent to the intrinsic light transmittance of said elements.

5. An optical device for the visual inspection of areas, comprising light transmitting means, means positioning said light transmitting means before the eyes, and a pair of oblong light transmitting elements of substantially greater light transmittance from said light transmitting means positioned one in the path of vision of each eye with their major axes disposed at substantially right angles to each other to be binocularly fused into partial coincidence intermediate the end portions of said elements to provide an area in a portion only of the field of vision having an effective binocular light transmittance equivalent to the intrinsic light transmittance of said elements.

6. Goggles for the visual inspection of areas including a pair of lenses, means for positioning said lenses each before one eye, and an oblong light transmitting element of substantially different light transmittance from said lenses disposed in each of said lenses with the major axes of the elements at substantially right angles to each other in a position to be binocularly fused into partial coincidence intermediate the end portions of said elements to provide an area in a portion only of the field of vision having an effective binocular light transmittance equivalent to the intrinsic light transmittance of said elements.

7. Goggles for the visual inspection of areas including a pair of lenses, means for positioning said lenses each before one eye, and an oblong light transmitting element of substantially less light transmittance from said lenses disposed in each of said lenses with the major axes of the elements at substantially right angles to each other in a position to be binocularly fused into partial coincidence intermediate the end portions of said elements to provide an area in a portion only of the field of vision having an effective binocular light transmittance equivalent to the intrinsic light transmittance of said elements.

WALTER R. MILES.